Figure 1:
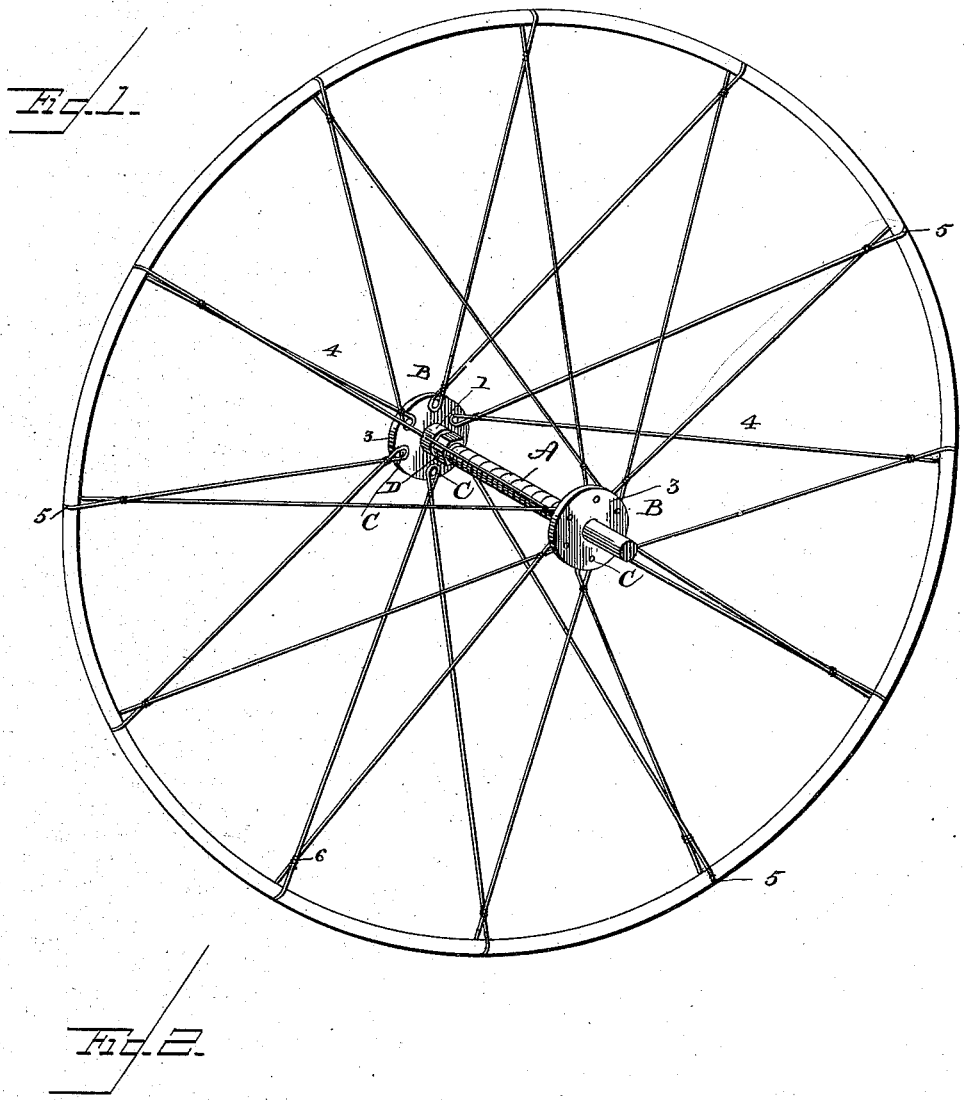

(No Model.)

J. NIPP, Jr.
VEHICLE WHEEL.

No. 401,965. Patented Apr. 23, 1889.

WITNESSES
F. L. Ourand
Geo. A. Wooster

INVENTOR
John Nipp, Jr.
by Louis Bagger & Co.
Attorney

UNITED STATES PATENT OFFICE.

JOHN NIPP, JR., OF NEW CASTLE, INDIANA.

VEHICLE-WHEEL.

SPECIFICATION forming part of Letters Patent No. 401,965, dated April 23, 1889.

Application filed January 15, 1889. Serial No. 296,395. (No model.)

*To all whom it may concern:*

Be it known that I, JOHN NIPP, Jr., a citizen of the United States, and a resident of New Castle, in the county of Henry and State of Indiana, have invented certain new and useful Improvements in Wheels for Bicycles and other Road-Machines; and I do hereby declare that the following is a full, clear, and exact description of the invention, which will enable others skilled in the art to which it appertains to make and use the same, reference being had to the accompanying drawings, which form a part of this specification.

This invention relates to wheels for bicycles and other road-machines.

The object is to produce a wheel for bicycles and other road-machines the spokes of which may be readily tightened when they have become loose from wear or by the vibratory motion imparted to them incident to the passage of the wheel over the ground; furthermore, to produce a wheel for bicycles and other road-machines which will obviate the necessity of having nuts attached to both ends of each spoke in order to tighten the same when they have become loose from any cause, and, finally, to produce a wheel which shall be simple of construction, efficient and durable in use, and which may be constructed at but a small expense.

With these objects in view the invention consists in the improved construction and combination of parts of a wheel for bicycles and other road-machines, as will be hereinafter fully described in the specification, illustrated in the drawings, and pointed out in the claim.

In the accompanying drawings, forming part of this specification, and in which like letters of reference indicate corresponding parts, I have illustrated one form of device embodying the essential features of my invention, although the same may be carried into effect in other ways without in the least departing from the spirit thereof.

Figure 2:
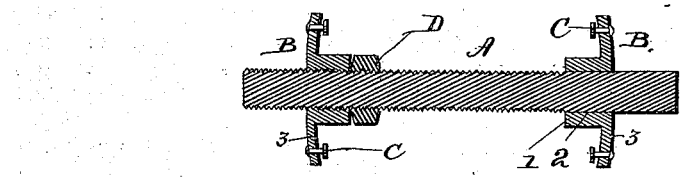

In the drawings, Figure 1 is a perspective view showing the device intact; and Fig. 2 is a detail view of the axle, showing the jam-nut and hubs in place thereon.

Referring to the drawings, A designates the axle of the wheel, nearly the entire length of which is screw-threaded, as shown.

B designates the hub, consisting of a shoulder, 1, through which extends an opening, 2, by means of which it is allowed to fit on the axle. On the outer side of this shoulder is formed a flange, 3, extending beyond the shoulder 1 of the hub. On the inner edge of this flange are secured studs or pins C, designed for holding the wire forming the spokes in place. Both of the hubs may be left movable on the axle; but it is preferable in this instance to have one of them stationary.

D designates the jam-nut, which fits and moves upon the threads of the axle, and is designed to engage the inner side of the hub, so that by running the nut out upon the axle the spokes may be tightened as desired.

From the studs or pins on the inner face of the flanges the wire 4, forming the spokes, passes over the tire and around one of the studs or pins on the opposite flange, crossing itself near the tire and near the flange on the hub, thereby presenting the greatest amount of spring-resistance at the greatest point of strain. After the circuit is completed both ends of the wire are securely fastened together. Around the tire extend transverse grooves or channels 5, in which the wires forming the spokes rest, so as to keep them out of contact with the ground, and also to hold them in place. At the point where the wire crosses itself near the tire it may be fastened by wrapping a piece of wire, 6, around the same, by soldering, or by other means.

Having now described the different parts of this wheel, I will proceed to explain its operation.

When it is desired to tighten the spokes, it is only necessary to screw the jam-nut against the shoulder of the hub, thereby causing the same to be forced out, and thus tighten the spokes. When it is desired to loosen the spokes in order to repair any portion of the wheel, it is only necessary to unscrew the jam-nut, when the spokes of the wheel will become loose, thereby enabling a person to repair the same with but little trouble and at a small expense. It will thus be seen that although this device is exceedingly simple of construction it will be found highly efficient and durable in use, and may be constructed at a nominal figure.

Having thus fully described my invention, what I claim as new, and desire to secure by Letters Patent, is—

In a wheel for vehicles and other road-machines, the combination of the axle carrying a stationary and an adjustable hub, studs on the said hubs, a tire having transverse grooves or channels in its periphery, a continuous wire passing around the studs and resting in the grooves or channels in the tire, strengthening-wires at the points where the wires cross each other near the tire, and a jam-nut on the axle for adjusting the said wires, substantially as described.

In testimony that I claim the foregoing as my own I have hereunto affixed my signature in presence of two witnesses.

JOHN NIPP, JR.

Witnesses:
WILLIAM J. KOONTZ,
WILLIAM H. HENDRICKS.